(No Model.) 2 Sheets—Sheet 1.
R. C. SNYDER.
BAKE PAN.
No. 596,668. Patented Jan. 4, 1898.
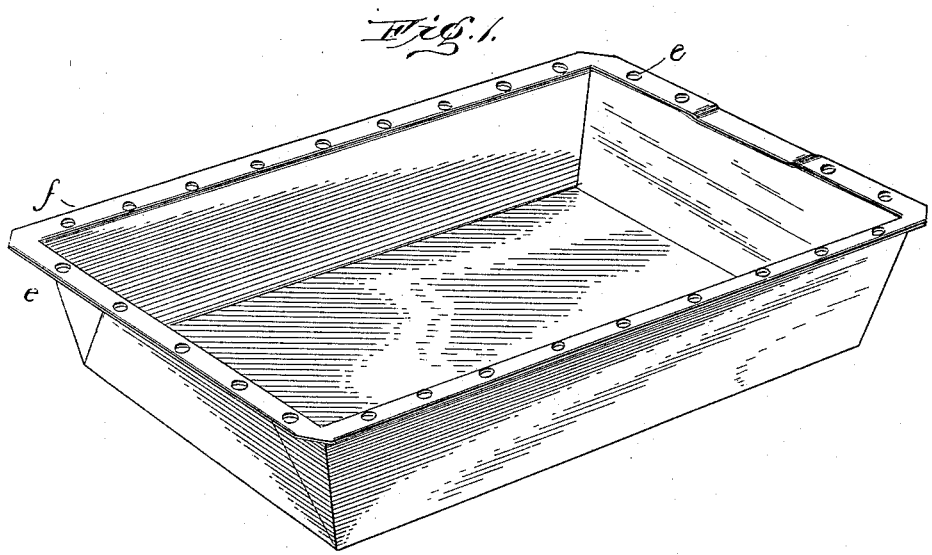
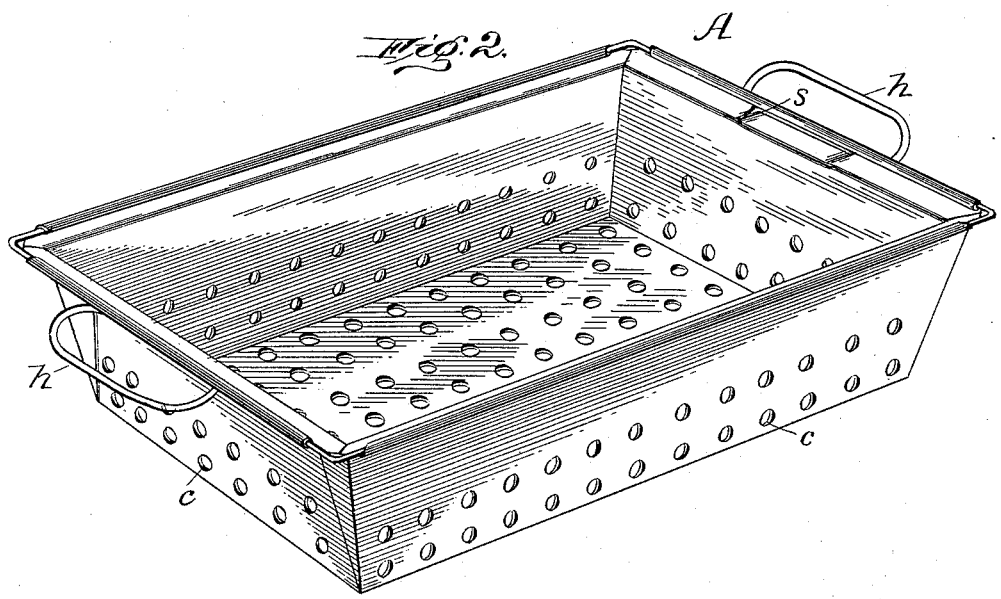
Witnesses:
J. M. Fowler Jr.
Walter P. Payne.
Inventor
Robert C. Snyder,
by Henry H. Bates,
his Attorney (No Model.) 2 Sheets—Sheet 2.
R. C. SNYDER.
BAKE PAN.
No. 596,668. Patented Jan. 4, 1898.
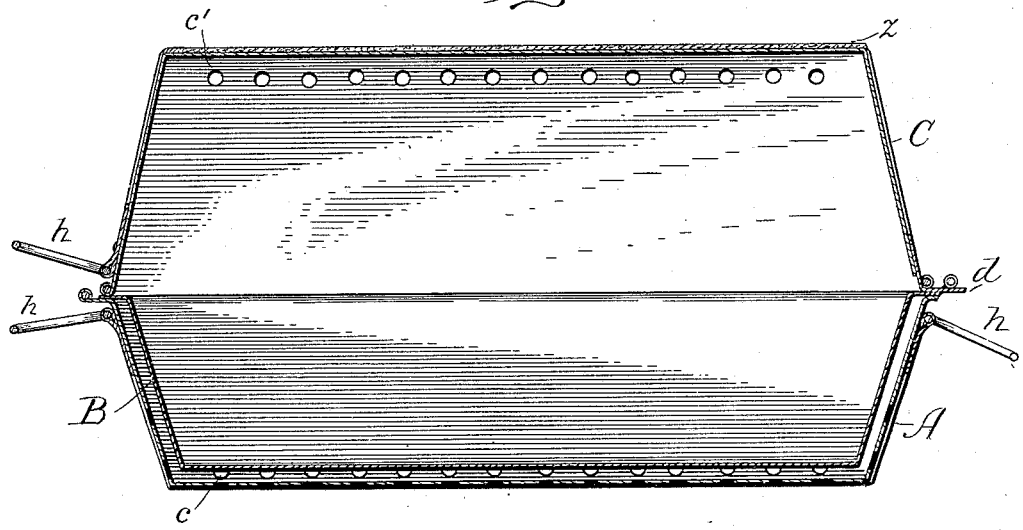
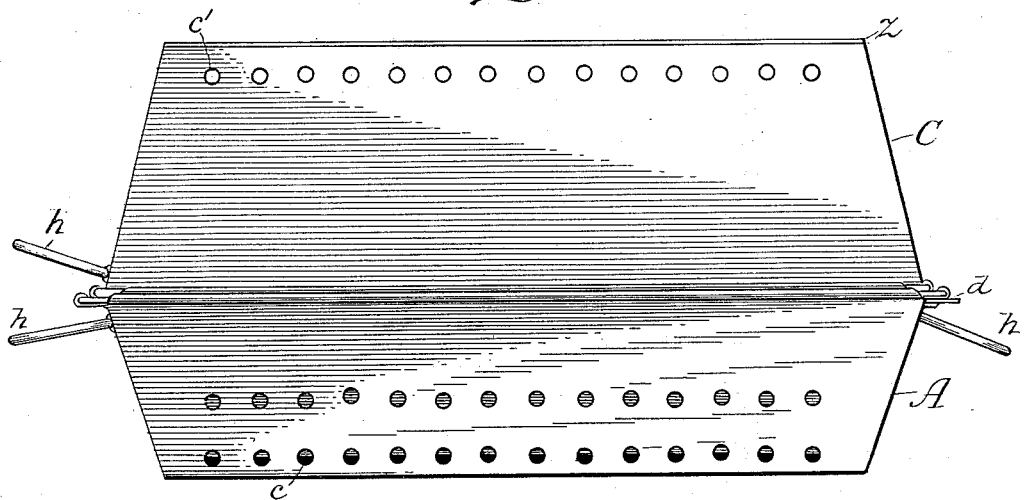
Witnesses:
J. M. Fowler Jr.
Walter D. Payne
Inventor:
Robert C. Snyder,
by Henry H. Bates,
his Attorney.

UNITED STATES PATENT OFFICE.

ROBERT C. SNYDER, OF CRAWFORDSVILLE, INDIANA.

BAKE-PAN.

SPECIFICATION forming part of Letters Patent No. 596,668, dated January 4, 1898.

Application filed June 8, 1897. Serial No. 639,807. (No model.)

*To all whom it may concern:*

Be it known that I, ROBERT C. SNYDER, a citizen of the United States, residing at Crawfordsville, in the county of Montgomery and State of Indiana, have invented certain new and useful Improvements in Bake-Pans; and I do hereby declare the following to be a full, clear, and exact description of the invention, such as will enable others skilled in the art to which it appertains to make and use the same.

My invention relates to sheet-metal pans for baking purposes, being an improvement on the device patented to me December 15, 1896, No. 573,045; and it consists in the combination of devices set forth in the following specification, and illustrated in the accompanying drawings, forming a part thereof, in which—

Figure 1 is a perspective view of the inner pan. Fig. 2 is a similar view of the outer pan. Fig. 3 is a lengthwise sectional view of the two pans assembled for use with cover, and Fig. 4 is a side elevation of the entire device with cover in place.

Like letters of reference indicate like parts in the several figures.

A is the outer pan, made usually of sheet metal, of any form or size required, the quadrangular being the preferred and usual form. I have shown in the figures of the drawings an oblong pan of the form of an inverted truncated pyramid. This outer pan is provided both on the bottom and the sides with apertures or perforations $c\,c$. The apertures in the sides and ends are preferably opposite each other, are located near the bottom, and are of a suitable size to freely admit the circulation of air.

B is an inner pan of the same general shape as the outer pan A, but smaller, so as to set within the latter and leave a free space all around both on the bottom and on the sides and ends. This inner pan is also usually made of sheet metal and is practically imperforate, except for some provision near the top or margin for purposes of the ventilation. This said inner pan is supported within the outer pan, on the edges of which it rests, by some suitable provision, such as an outturned flange $f$ all around or lugs placed at intervals, as in the former device, by which it is held in a fixed position at a proper distance from the sides, ends, and bottom of the said outer pan, which yet permit it to be freely lifted and removed therefrom. The proportions of the spacing may be varied to suit circumstances; but I have found in pans of the size usually preferred for baking that a spacing of about one-half of an inch, more or less, is sufficient for good results. Where the lugs are used as supports for the inner pan, the latter will be entirely imperforate, since the provision for air circulation is ample; but where an outturned margin or flange is employed as a means of support I make apertures $e$ in or near the said flange to allow of free circulation of air, for purposes hereinafter mentioned.

The employment of the imperforate pan above described constitutes an important difference between my present device and the one formerly patented by me above referred to. While the said patented device is admirable for bread-baking, the foraminous material admitting air to every portion of the surface of the loaf, it is not as well adapted to the baking of custards, puddings, cakes, and all that class of articles compounded in semiliquid form which are not retained by the foraminous material. It is also not adapted to the baking of meats and vegetables, which are perfectly cooked by my present device, as shown in Fig. 4.

C is a third element—namely, a cover—which I use in conjunction with the said outer perforated pan and the said imperforate inner pan for the class of baking to which the present device is adapted. The said cover, which may be either dome-shaped or of truncated pyramidal form, as shown, according to preference, is made so as to fit the top of the outer pan A and preferably has a row of apertures or perforations $c'$ near its top to afford ventilation and circulation. This cover has also other uses, to be presently mentioned. The said cover may, however, be dispensed with in certain kinds of baking, as in the former device. When made in the form shown or in any other suitable form, it preferably has a sheet or layer of asbestos board $z$ cemented or otherwise united to its top as a protection from the extreme heat of the oven above. The cover is essential for the roasting of meats and is also useful in a quick oven in bread-baking to prevent burning the loaves on top. I prefer in practice to make the cover a little higher than the depth of the outer pan A.

In operation, the inner pan being adjusted in its place within the outer pan, the material to be baked is placed therein and the cover is put on when the baking is such as to require it. The whole is then placed in an oven heated to a suitable temperature, and the baking is quickly and evenly effected without the possibility of scorching or burning, since the spacing between the two receptacles prevents the direct contact of the highly-heated floor of the oven with the vessel containing the material to be baked, while the apertures in the outer pan allow the hot air to enter and circulate freely and evenly all around the inner receptacle, which gets the requisite heat in a uniform manner by convection of the air-currents and not irregularly by conduction through the walls of a metallic receptacle in direct contact with the source of heat. In the case of meats and vegetables the cover confines the ascending currents of heated air in due measure over the top of the material to be cooked without unduly interfering with the circulation.

The apparatus can also be used as a convenient dish-drainer by inverting the cover and placing the foraminous outer pan therein.

The device can also be used as a steamer by arranging as for a dish-drainer and using the imperforate pan as a cover.

I claim and desire to secure by Letters Patent—

1. A utensil for baking purposes, consisting of an outer pan having apertures in the bottom and walls thereof, and an inner pan, practically imperforate, removably suspended within the said outer pan without touching the same at the bottom or walls, whereby spaces for air circulation are left between the two pans at the bottom and sides and ends, substantially as and for the purpose specified.

2. A utensil for baking purposes, consisting of an outer pan, having apertures in the bottom and walls thereof, an inner pan, practically imperforate, removably suspended within the said outer pan with an intervening space all around the bottom and walls thereof, permitting the free circulation of heated air between the two vessels, and a cover, fitting the said outer pan, substantially as and for the purpose specified.

In testimony whereof I affix my signature in presence of two witnesses.

ROBERT C. SNYDER.

Witnesses:
  C. W. TRUAX,
  J. F. RECORD.